United States Patent [19]

Yamanishi et al.

[11] Patent Number: 4,875,092
[45] Date of Patent: Oct. 17, 1989

[54] IMAGE FORMING APPARATUS WITH POSITIONING-MARK FORMING FUNCTION

[75] Inventors: Eiichi Yamanishi, Kawasaki; Yasuo Abuyama, Ebina; Akihiko Someya, Yokohama, all of Japan

[73] Assignee: Kabushiki Kaisha Toshiba, Kawasaki, Japan

[21] Appl. No.: 84,560

[22] Filed: Aug. 12, 1987

[30] Foreign Application Priority Data

Aug. 15, 1986 [JP] Japan ................................. 61-190599
Aug. 15, 1986 [JP] Japan ................................. 61-191264

[51] Int. Cl.$^4$ ............................................. H04N 1/46
[52] U.S. Cl. ......................................... 358/75; 358/78
[58] Field of Search ................................. 358/75, 78

[56] References Cited

U.S. PATENT DOCUMENTS

| | | | |
|---|---|---|---|
| 4,320,419 | 3/1982 | Cottriall | 358/75 X |
| 4,342,046 | 7/1982 | Kamata | 358/75 |
| 4,463,373 | 7/1984 | Mikami | 358/75 X |
| 4,485,413 | 11/1984 | Furuta et al. | 358/75 X |
| 4,517,590 | 5/1985 | Nagashima et al. | 358/75 |
| 4,652,914 | 3/1987 | Kitagawa | 358/75 |
| 4,667,227 | 5/1987 | Ikeda | 358/75 |
| 4,668,978 | 5/1987 | Gokita | 358/75 X |
| 4,679,071 | 7/1987 | Kitagawa | 358/75 |

FOREIGN PATENT DOCUMENTS

| | | | |
|---|---|---|---|
| 60-85670 | 5/1985 | Japan | 358/75 |
| 60-85674 | 5/1985 | Japan | 358/75 |

OTHER PUBLICATIONS

*Separation Work*, Fundamental Knowledge of Practical Photoplate Making 3, Third Edition, Koyosha Inc., pp. 224–225.

*Primary Examiner*—Edward L. Coles, Sr.
*Assistant Examiner*—Mark R. Powell
*Attorney, Agent, or Firm*—Foley & Lardner, Schwartz, Jeffery, Schwaab, Mack, Blumenthal & Evans

[57] ABSTRACT

A color image data output section outputs color image data as a main image formed on an image forming medium. A positioning-mark data output section outputs positioning mark data representing a positioning mark to be formed at a predetermined position of the image forming medium for use after the image is formed. An image forming section forms the main image on the image forming medium by using a single- or multi-color agent and, at the same time, forms the positioning mark at the predetermined position of the image forming medium in accordance with the color image data and the positioning mark data.

9 Claims, 14 Drawing Sheets

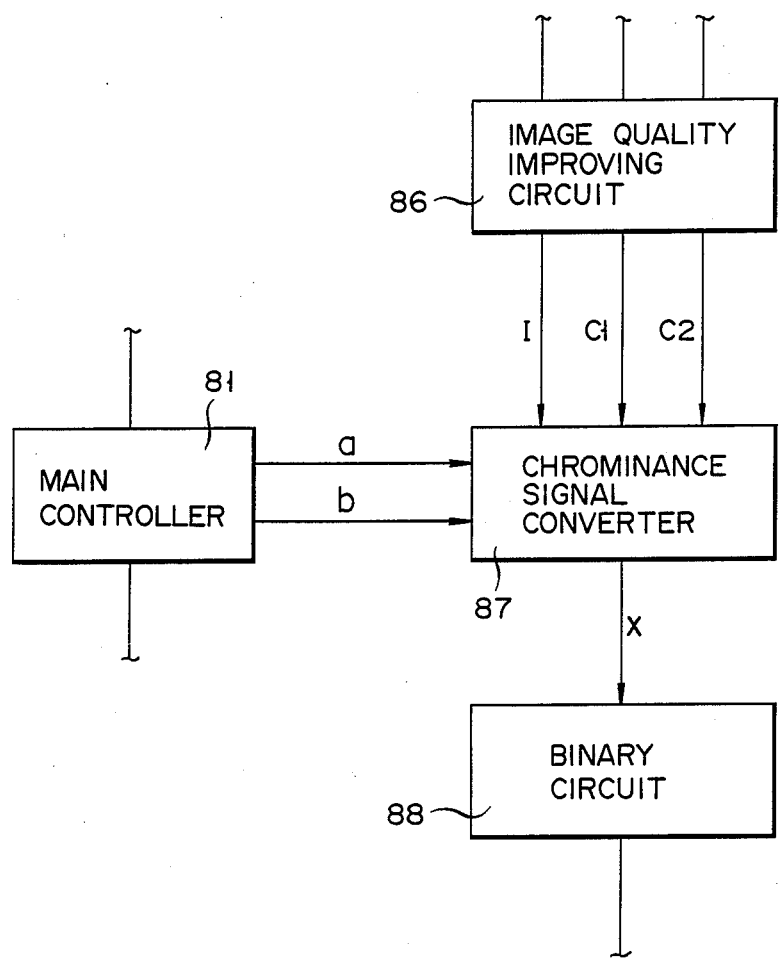
F I G. 10

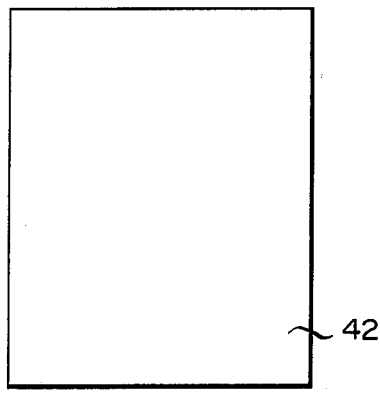
F I G. 14A
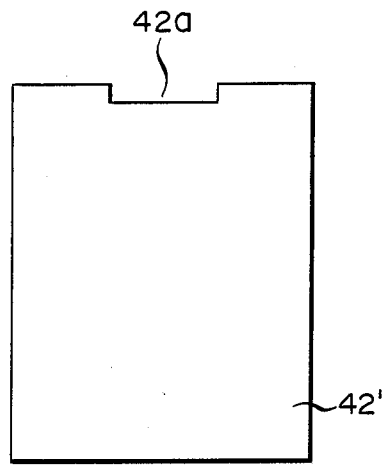
F I G. 14B
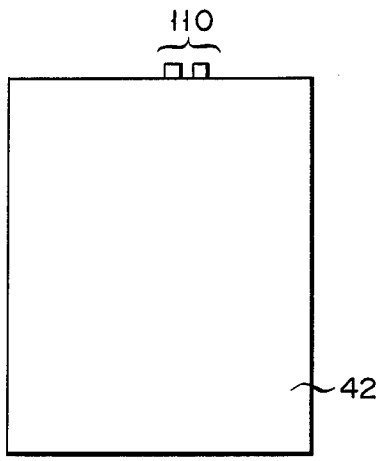
F I G. 16A
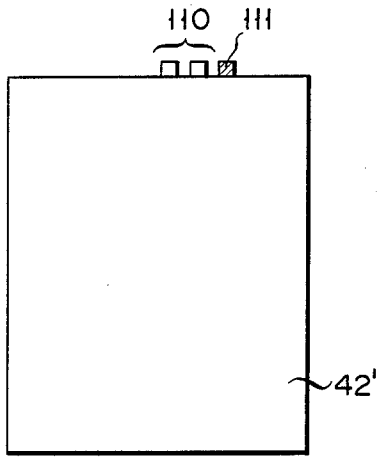
F I G. 16B

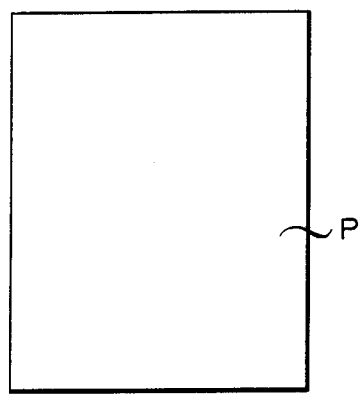 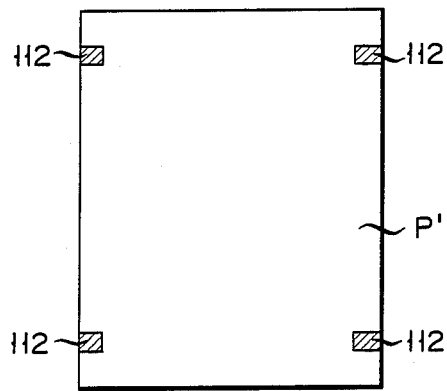
F I G. 17A F I G. 17B
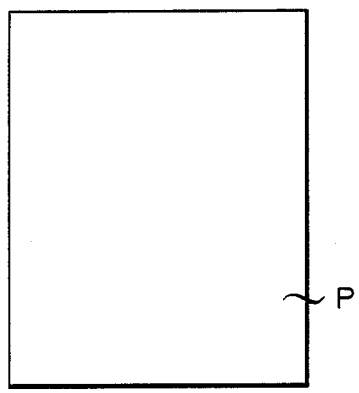 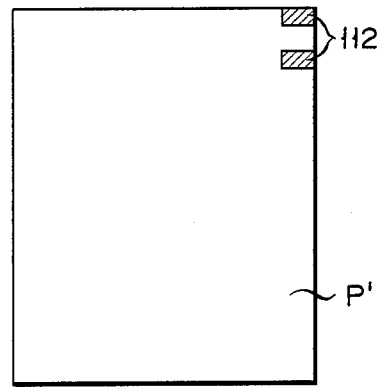
F I G. 18A F I G. 18B

IMAGE FORMING APPARATUS WITH POSITIONING-MARK FORMING FUNCTION

BACKGROUND OF THE INVENTION

This invention relates to an image forming apparatus with a positioning-mark forming function and, more particularly, to an image forming apparatus for forming a color-separated original image required for forming an original plate in offset printing.

In recent years, graphic arts printing has developed markedly along with an advance in electronics, and electronic graphic arts printing has become very popular. In electronic graphic arts printing, the density of an image of an original is photoelectrically converted into an electrical signal and the electrical signal is subjected to predetermined processing to obtain a light intensity signal. The intensity signal is used to expose a film (photosensitive medium) with light. The exposed film is developed to prepare a negative or positive film for an original plate.

According to the above technique, however, the printing process is complicated and the printing equipment is bulky, thus resulting in high costs. A conventional system is designed to produce only graphic arts films and cannot be used for other applications.

In order to align graphic arts films (block copies) of the respective colors, positioning marks (so-called register marks) are manually adhered to graphic arts films, thus degrading operability and causing potential positional shifts.

SUMMARY OF THE INVENTION

It is, therefore, an object of the present invention to provide a new and improved, compact, inexpensive image forming apparatus with a positioning-mark forming function, which can easily produce graphic arts films without performing the conventional complicated process, which can be used for other applications such as a color copying machine in addition to a machine for producing only graphic arts films, and which allows easy and accurate formation of positioning marks to the graphic arts films.

According to the present invention, there is provided an image forming apparatus with a control information input function, the apparatus comprising:

color image data output means for outputting color image data representing a main image to be formed on an image forming medium;

positioning-mark data output means for outputting positioning mark data for forming a positioning mark at a predetermined position on the image forming medium, the positioning mark being used after a main image is formed; and image forming means for forming the main image on the image forming medium using one or a plurality of color agents and the positioning mark at the predetermined position of the image forming medium in accordance with the color image data and the positioning mark data.

BRIEF DESCRIPTION OF THE DRAWINGS

These and other objects and features of the present invention can be understood through the following embodiments by reference to the accompanying drawings, in which:

FIGS. 1 to 13B are views for explaining an image forming apparatus according to a first embodiment of the present invention, in which FIG. 1 is a partially cutaway perspective view schematically showing the overall arrangement of the image forming apparatus, FIG. 2 is a perspective view showing the outer appearance of the image forming apparatus, FIG. 3 is a schematic side view showing an arrangement of an original scanning unit in the apparatus, FIG. 4 is a perspective view showing a scanner moving mechanism of the original scanning unit shown in FIG. 3, FIG. 5 is a longitudinal sectional view schematically showing the arrangement of an image forming unit in the apparatus, FIG. 6 is a perspective view for explaining a transfer operation state, FIG. 7 is a plan view showing an arrangement of a thermal transfer ink ribbon, FIG. 8 is a plan view of an operation panel in the apparatus, FIG. 9 is a schematic block diagram of a control system in the apparatus, FIG. 10 is a detailed block diagram for explaining a chrominance signal converter in the control system, FIG. 11 is a schematic block diagram of a positioning-mark generator, FIGS. 13A-1, 13A-2 and 13B are flow charts for explaining the operation of the first embodiment; and FIGS 14A to 18B are views for explaining the main part of a second embodiment, in which FIGS. 14A and 14B are views showing outer shapes of paper cassettes, FIG. 15 is a flow chart for explaining the operation of the second embodiment, FIGS. 16A and 16B are views for explaining paper cassette discrimination pawls, and FIGS. 17A and 17B and FIGS. 18A and 18B are views for discriminating normal sheets from block copy sheets.

DETAILED DESCRIPTION OF THE PREFERRED EMBODIMENTS

A preferred embodiment of the present invention will be described with reference to the accompanying drawings.

Figure 1:
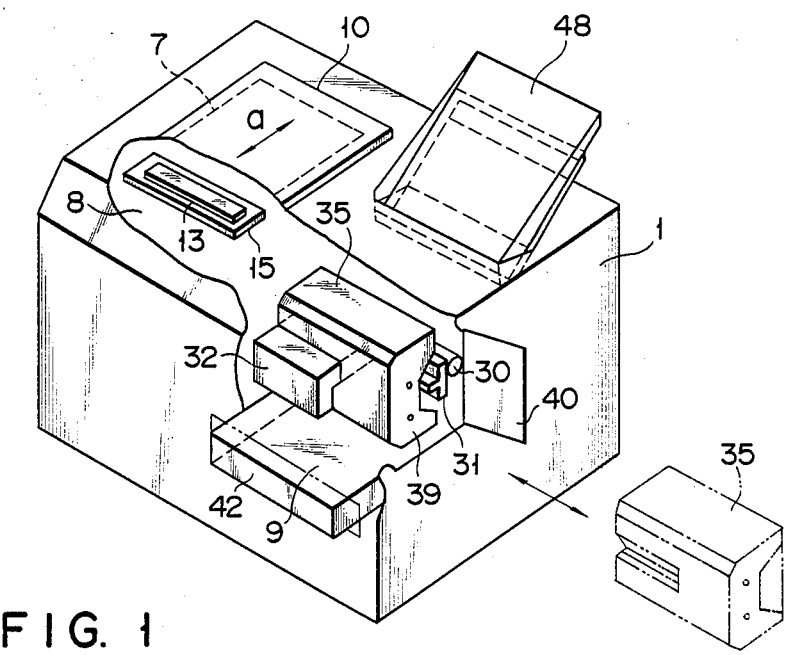
Figure 2:
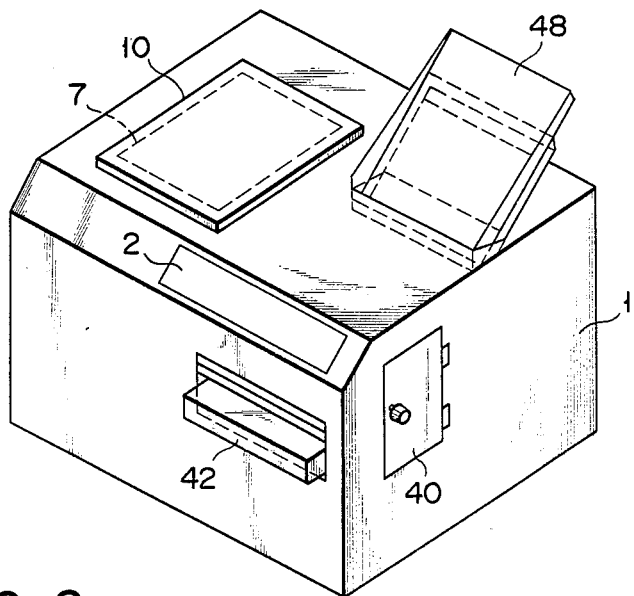

FIGS. 1 and 2 show a thermal transfer color copying machine as an image forming apparatus of the present invention, in which multicolor copies and graphic arts films (block copies) are selectively formed. Reference numeral 1 denotes a copying machine housing. Operation panel 2 is arranged on the front portion of the upper surface of housing 1. Original scanning unit 8 is arranged in the left portion of housing 1 to scan an original set on original table 7. Image forming unit 9 is arranged in the right portion of housing 1. Reference numeral 10 denotes an original cover mounted on table 7 to be freely opened/closed.

Figure 3:
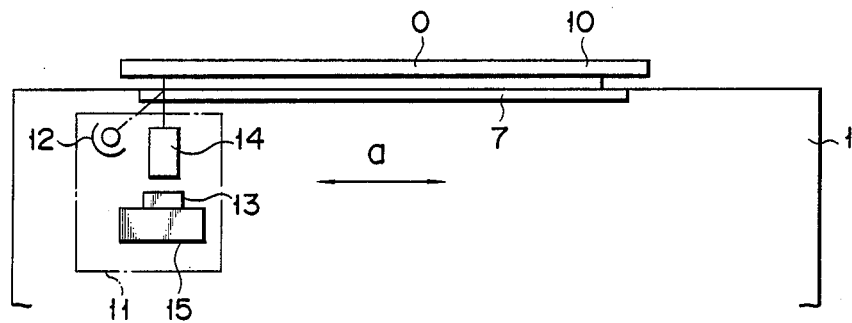
Figure 4:
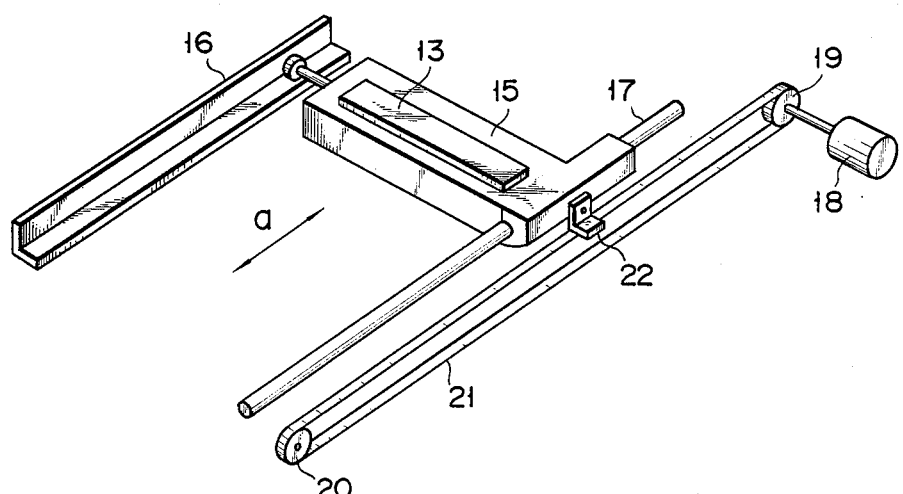

Original scanning unit 8 is arranged, as shown in FIGS. 3 and 4. Original table 7 is fixed on housing 1. Scanner 11 is arranged below table 7 and reciprocated in the directions indicated by arrow a along the lower surface of table 7 to optically scan original 0 set on table 7. Scanner 11 thus reads an image formed on original 0. Scanner 11 comprises illumination lamp 12 for illuminating original 0, photoelectric transducer 13 for receiving light reflected by original 0, optical system 14 for guiding light reflected by original 0 to transducer 13, and carriage 15 for supporting lamp 12, transducer 13, and optical system 14. Transducer 13 photoelectrically converts light reflected by original 0 into electrical signals. The image of original 0 is separated into cyan, green, and yellow (or red, green, and blue) color signals. Transducer 13 mainly comprises a CCD line image sensor. As shown in FIG. 4, carriage 15 is reciprocally guided in directions indicated by arrow a by guide rail 16 and guide shaft 17. Driving pulley 19 driven by reversible scanning motor (e.g., a pulse motor) 18 is coupled to one end of guide shaft 17. Driven pulley 20 is coupled to the other end of shaft 17. Timing belt 21 is looped between pulleys 19 and 20. One point of belt 21 is fixed to carriage 15 through fixing member 22. When scanning motor 18 is rotated in the forward or reverse direction, carriage 15 is linearly driven.

Figure 5:
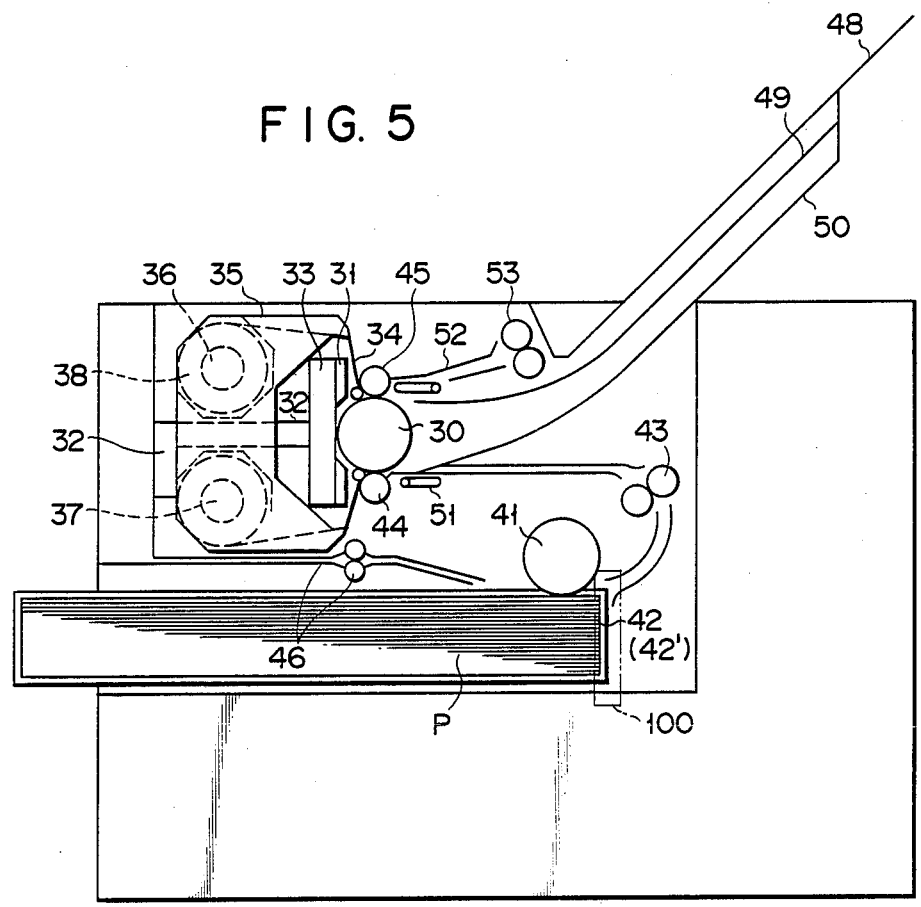
Figure 9:
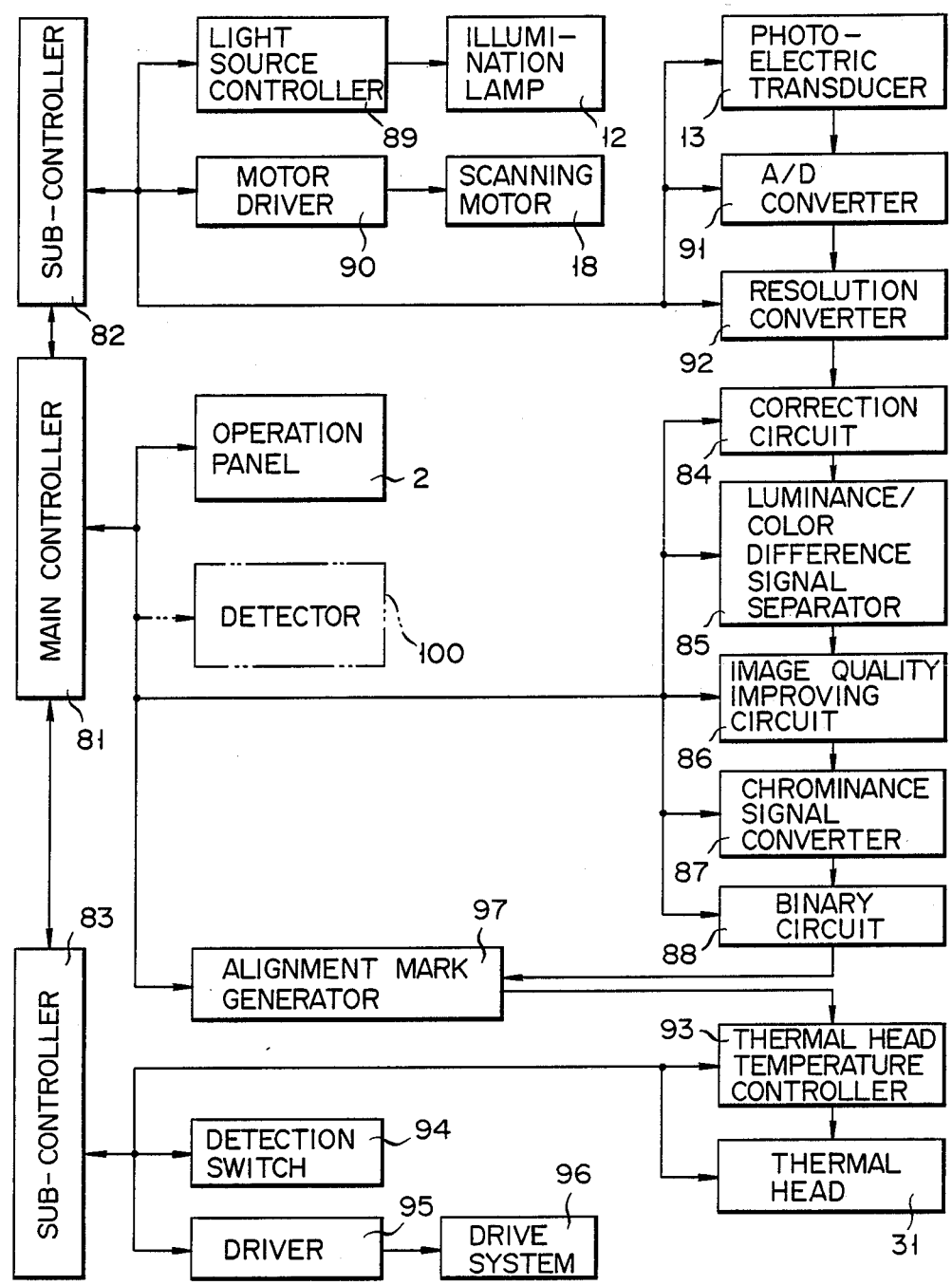

Image forming unit 9 is arranged as shown in FIG. 9. Platen 30 is arranged substantially at the center of image forming unit 9. Thermal head 31 is arranged to the left of platen 30. Head 31 is mounted on radiator 33 integral with the rear end face of holder 32. Ribbon cassette 35, which stores thermal transfer ink ribbon 34 as an image forming medium, is detachably loaded through holder 32. Ink ribbon 34 is interposed between head 31 and platen 30. As shown in FIG. 5, ribbon cassette 35 comprises two parallel reels 36 and 37. Ink ribbon 34 is housed in case 38 such that both ends of ink ribbon 34 are respectively wound around reels 36 and 37 and that the intermediate portion of ink ribbon 34 is partially exposed to be interposed between platen 30 and head 31. Reels 36 and 37 can be coupled to a drive shaft of a motor (not shown) through a drive force transmission mechanism (not shown) and can be rotated as needed. As shown in FIG. 1, ribbon cassette 35 can be detachably loaded in or unloaded from holder 32 through opening 39 formed on the right side surface of housing 1. Cover 40 is arranged to cover opening 39 and can be freely opened/closed.

Paper feed roller 41 is located to the lower right of platen 30 and picks up sheets (or plastic films) P as image transfer media stored in paper cassette 42 one by one. Sheet P picked up by roller 41 is fed to registration rollers 43 located to the upper right of roller 41. The leading end of sheet P is aligned by registration rollers 43. Sheet P is then fed toward platen 30 by rollers 43 and is wound around platen 30 by press rollers 44 and 45. Therefore, sheet P can be accurately fed. Paper cassette 42 is detachably mounted in the front surface of housing 1. Reference numeral 46 in FIG. 5 denotes a manual feed unit for allowing an operator to manually feed a single sheet.

Figure 6:
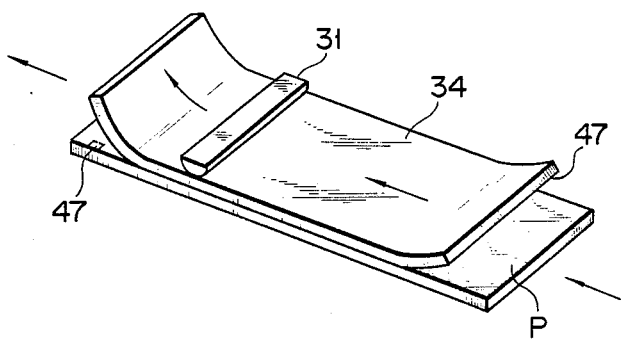
Figure 7:
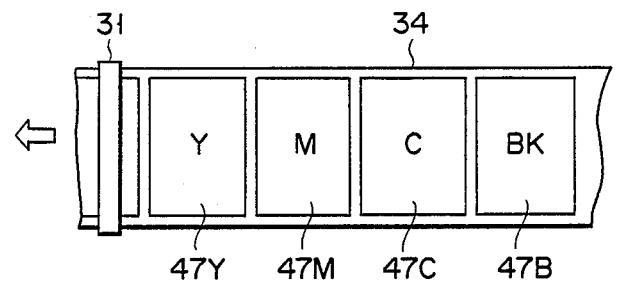

Thermal head 31 urges sheet P against platen 30 through thermal transfer ink ribbon 34 and is designed to heat and melt ink 47 as a color agent on ink ribbon 34 so as to transfer a melted ink to sheet P, as shown in FIG. 6. In ink ribbon 34, yellow, magenta, cyan, and black ink portions 47Y, 47M, 47C, and 47B are arranged in the order named, as shown in FIGS. 6 and 7. Each of ink portions 47Y, 47M, 47C, and 47B has a length substantially equal to the width of sheet P. Head 31 transfers each ink to sheet P and returns to the home position, thereby accurately overlaying the inks one by one. Ink ribbon 34 need not have black ink portion 47B. In this case, overlaying of yellow, magenta, and cyan inks produces black color.

In a full-color copying mode, ink portions 47Y, 47M, 47C, and 47B of ink ribbon 34 are used to form a full-color image.

However, in order to produce a graphic arts film, a black thermal transfer ink ribbon is used as ink ribbon 34 to form an image. In this case, the black thermal transfer ink ribbon need not be used, but black ink portion 47B of ribbon 34 may be used to form an image on the graphic arts film.

In the full-color copying mode, sheet P is repeatedly reciprocated by the number of platen revolutions corresponding to the number of colors. In this case, sheet P is guided onto first and second guide plates 49 and 50 sequentially disposed along the lower surface of discharge tray 48 obliquely inclined on housing 1. Selective feeding of sheet P is performed by selector gates 51 and 52 respectively disposed between platen 30 and first guide plate 49 and between platen 30 and second guide plate 50. More specifically, sheet P picked up from paper cassette 42 is fed through registration rollers 43 and first selector gate 51. After the leading end of sheet P is wound around platen 30, platen 30 is driven in the forward direction by a pulse motor (not shown). Thus, sheet P is fed at a constant speed. At the same time, heating elements (not shown) of thermal head 31 which are aligned in line along the axial direction of platen 30 are selectively heated in accordance with a printing signal, and ink 47 of ink ribbon 34 is transferred to sheet P. The leading end of sheet P passing through platen 30 is fed to first guide plate 49 disposed along the lower surface of discharge tray 48 by second selector gate 52 located at a position indicated by the solid line. When transfer of one ink 47 to sheet P is completed, platen 30 is rotated in the reverse direction. Sheet P is then fed in the reverse direction and is returned to the transfer start position. In this case, the trailing end of sheet P is directed by first selector gate 51 toward second guide plate 50 disposed along the lower surface of first guide plate 49. In this manner, sheet P is repeatedly reciprocated to transfer inks of different colors thereto. When all inks 47 have been transferred to sheet P, sheet P is guided to discharge rollers 53 by second selector gate 52 pivoted to a position indicated by the alternate long and two short dashed line. Sheet P is finally discharged onto discharge tray 48 by discharge rollers 53.

In order to form an image using a black thermal transfer ink ribbon, i.e., in order to form a graphic arts film, the number of transfer cycles is one, and no reciprocation of sheet P is performed. After one transfer cycle, sheet P is discharged onto discharge tray 48.

Figure 8:
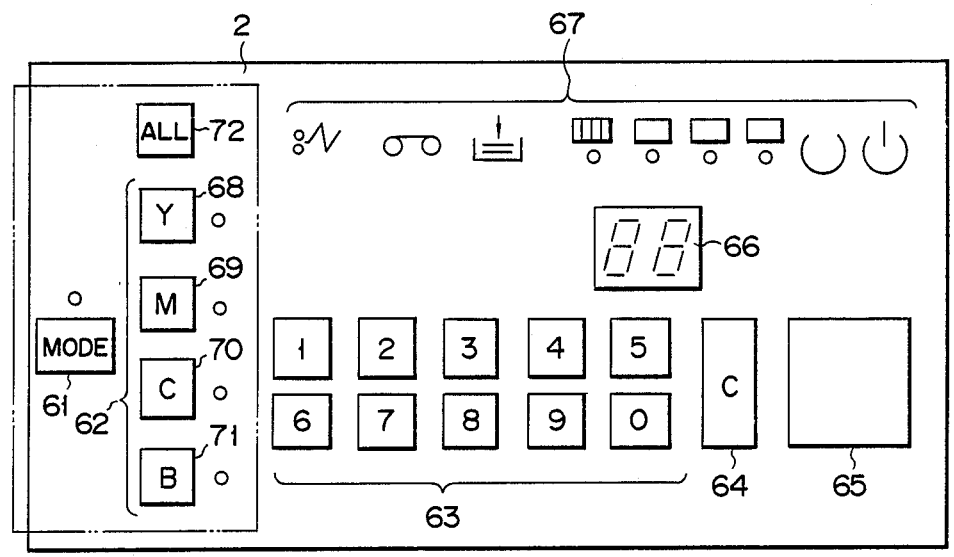

FIG. 8 shows operation panel 2. Panel 2 includes mode key (mode selection switch) 61 for selecting one of the normal mode (color copying mode) and single-color mode (graphic arts film formation mode), color selection keys (color selection switches) 62 for designating colors in the single-color mode, ten-key pad 63 for entering the number of sheets to be copied, clear key 64 for clearing the number of sheets to be copied, copying key 65 for initiating copying, numerical display 66 for displaying the number of copied sheets, and state display 67 for displaying an operating state. Color selection keys 62 comprise Y key 68 for designating yellow (Y), M key 69 for designating magenta (M), C key 70 for designating cyan (C), B key 71 for designating black (B) and continuous printing key 72 for designating sequential outputs of the different colors.

FIG. 9 schematically shows the overall control system. The system comprises main controller 81 and first and second sub-controllers 82 and 83. Controller 81 is connected to operation panel 2, correction circuit 84, luminance/color difference signal separator 85, image quality improving circuit 86, chrominance signal converter 87, binary circuit 88, positioning-mark (register mark) generator 97, and first and second sub-controllers 82 and 83 and controls them. First sub-controller 82 is connected to light source controller 89, motor driver 90, photoelectric transducer 13, A/D converter 91, and resolution converter 92 and controls them. Light source controller 89 is connected to lamp 12 to control the amount of light emitted thereby. Motor driver 90 is connected to scanning motor 18 and drives it. Second sub-controller 83 is connected to thermal head temperature controller 93, thermal head 31, various detection switches 94, and driver 95 and controls them. Driver 95 is connected to drive system 96 such as a motor and a solenoid and drives it.

When the single-color mode is selected by mode key 61 in operation panel 2, main controller 81 supplies a mark-forming signal ("1" signal) to positioning-mark generator 97.

The signal flow in the arrangement shown in FIG. 9 will be described below. Light emitting from lamp 12 and reflected by the original is focused on photoelectric transducer 13. Transducer 13 separates the reflected light into cyan (C), green (G), and yellow (Y) analog color signals. These analog signals are supplied to A/D converter 91. A/D converter 91 converts these analog color signals into digital color signals. The digital signals are supplied to resolution converter 92. Converter 92 performs resolution conversion for matching the resolution of transducer 13 with that of thermal head 31. A conversion result from converter 92 is supplied to correction circuit 84. Correction circuit 84 performs correction processing of C, G, and Y color signals sent from resolution converter 92 so as to correct variations in photoelectric transducer 13. A correction result is sent to luminance/color difference signal separator 85. Separator 85 performs various types of processing for the C, G, and Y color signals from correction circuit 84 to generate a luminance signal (I) and color difference signals (C1 and C2). The luminance and color difference signals are supplied to image quality improving circuit 86. Circuit 86 analyzes the luminance signal and the first and second color difference signals to perform image improving processing such as edge emphasis and character designation. An output from circuit 86 is supplied to chrominance signal converter 87. Converter 87 performs color conversion on the basis of the luminance and color difference signals after image quality improvement and generates one of yellow (Y), magenta (M), cyan (C), and black (B) (printing primaries (Y, M, and C) plus B) color signals. The selected color signal is supplied to binary circuit 88. Circuit 88 performs gray scale conversion, i.e., binarization of the color signal (i.e., one of the Y, M, C, and B color signals). The binary signal from circuit 88 is supplied to positioning-mark generator (generating means) 97. Generator 97 adds a pattern of positioning marks A to the binary signal from binary circuit 88 in response to the mark-forming signal ("1" signal) from main controller 81. The output from generator 97 is supplied to thermal head temperature controller 93. Alternatively, generator 97 supplies the binary signal from binary circuit 88 to controller 93 without adding the pattern of positioning marks A to the binary signal. Thermal head temperature controller 93 sends a printing signal to thermal head 31 on the basis of the binary signal sent from positioning-mark generator 97. Thermal head 31 performs printing (i.e., image formation) on the basis of the printing signal.

Chrominance signal converter 87 will be described in more detail with reference to FIG. 10. The luminance signal (I), the color difference signal (C1) and the color difference signal (C2) all of which are sent from image quality improving circuit 86 are input to chrominance signal converter 87. One of the Y, M, C, and B signals is selected and sent to binary circuit 88. Selection for the Y, M, C, and B color signals is controlled by main controller 81. More specifically, controller 81 supplies selection signals a and b to chrominance signal converter 87. One of the Y, M, C, and B color signals to be sent to binary circuit 88 is selected according to a combination of selection signals a and b sent to chrominance signal converter 87, as summarized in the following table.

|   | a | b |
|---|---|---|
| Y | 0 | 0 |
| M | 0 | 1 |
| C | 1 | 0 |
| B | 1 | 1 |

In this case, color signals are automatically selected in a given order (e.g., an order of Y, M, C, and B) in the full-color copying mode. However, when key 72 is not depressed in the single-color mode, the color signal corresponding to one of color selection keys 62 is selected.

Figure 11:
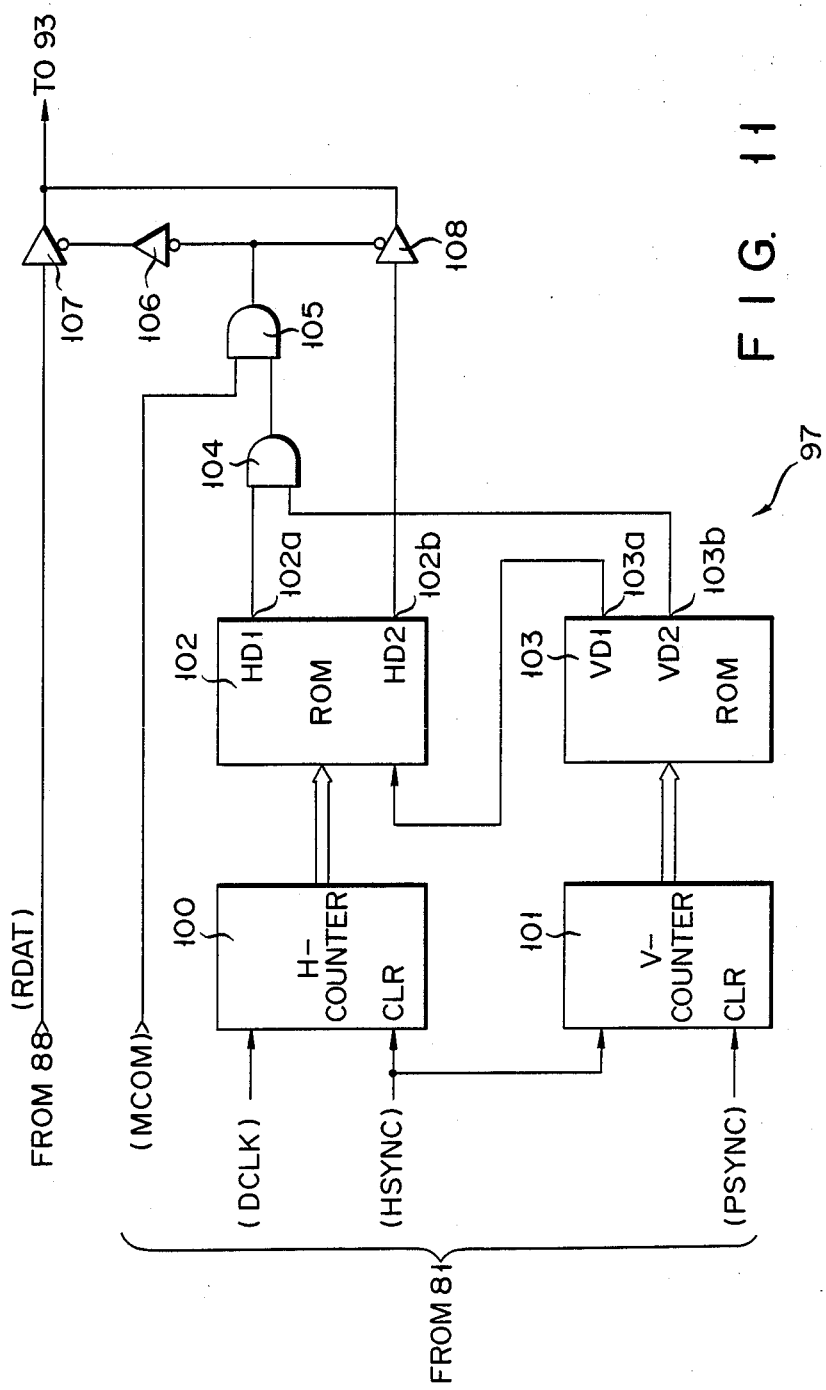

Positioning-mark generator 97 will be described in more detail with reference to FIG. 11. Positioning-mark generator 97 comprises: horizontal counter 100 which performs a count-up operation in response to a data sync signal (DCLK) from main controller 81 and is cleared in response to a line sync signal (HSYNC); vertical counter 101 which performs a count-up operation in response to the line sync signal (HSYNC) from main controller 81 and is cleared in response to a page sync signal (PSYNC); ROM 102 for outputting, at output terminals 102a (HD1) and 102b (HD2), address signals corresponding to a count from horizontal counter 100 and a pattern selection signal from output terminal 103a of ROM 103; ROM 103 for outputting an address signal corresponding to a count of vertical counter 101 from output terminals 103a (VD1) and 103b (VD2); AND gate 104 for producing an AND output of the horizontal mark signal from output terminal 102a and the vertical mark signal from output terminal 103b; AND gate 105 for producing an AND output of the mark-forming signal (MCOM) from main controller 81 and an output from AND gate 104; buffer 107 for supplying the binary signal (image data or RDAT) to thermal head temperature controller 93 only when the output from AND gate 105 is not supplied through inverter 106; and buffer 108 for outputting register mark data (i.e., positioning mark data) from output terminal 102b of ROM 102 to thermal head temperature controller 93 only when the output from AND gate 105 is supplied thereto.

Patterns of positioning marks A are set in ROMs 102 and 103. The relationship between the outputs and data output to thermal head temperature controller 93 is summarized as follows:

| Output | Output Terminal 102a | Output Terminal 103b | Output Terminal 103a | Output Terminal 102b | Mark-Forming Signal |
|---|---|---|---|---|---|
| Register mark data 1 | 1 | 1 | 1 | data 1 | 1 |
| Register mark data 2 | 1 | 1 | 0 | data 2 | 1 |
| Image data | 0 | — | — | — | — |
| Image data | — | 0 | — | — | — |
| Image data | — | — | — | — | 0 |

Figure 12A:
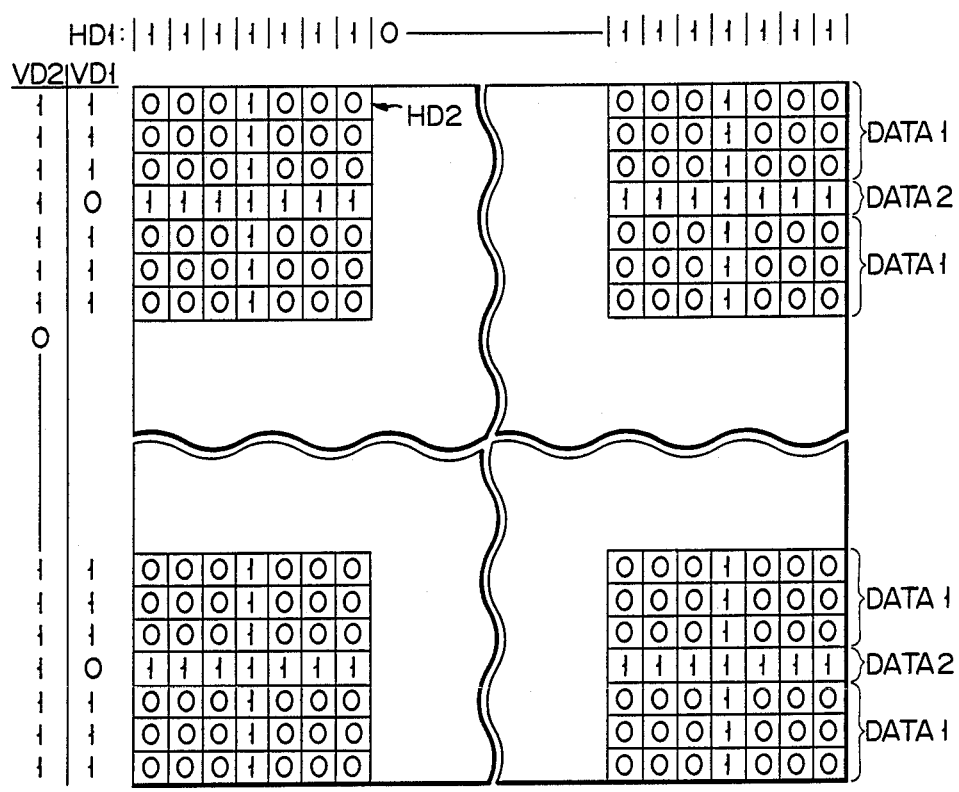
FIG. 12A is a view showing the relationship between image data and positioning-mark patterns.
Figure 12B:
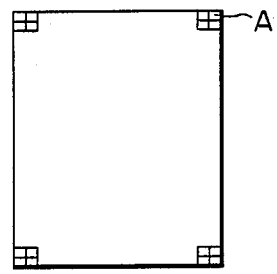
FIG. 12B is a view showing a print state of the image and positioning marks.
Figures 1, 13A:
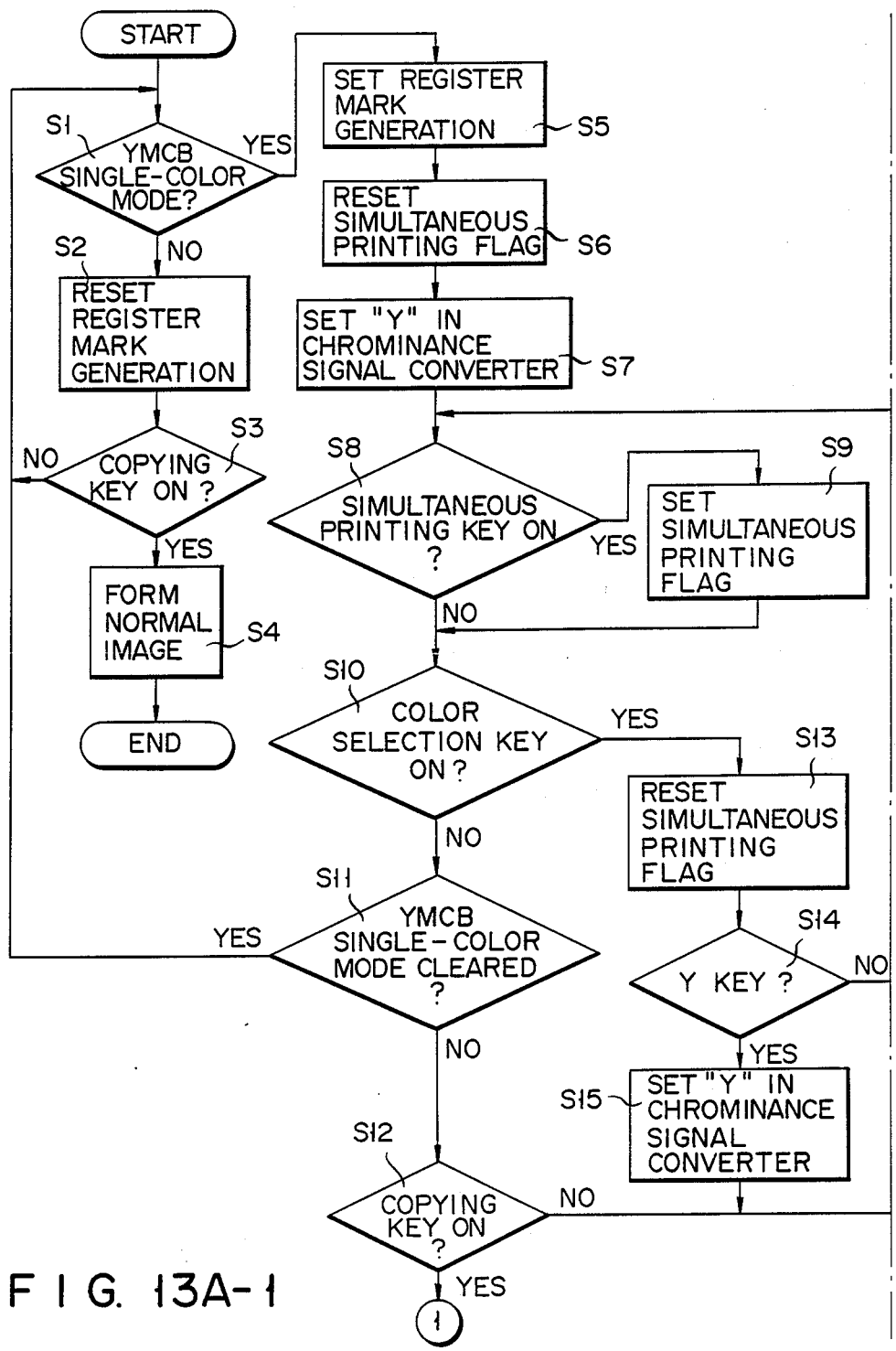
Figures 2, 13A:
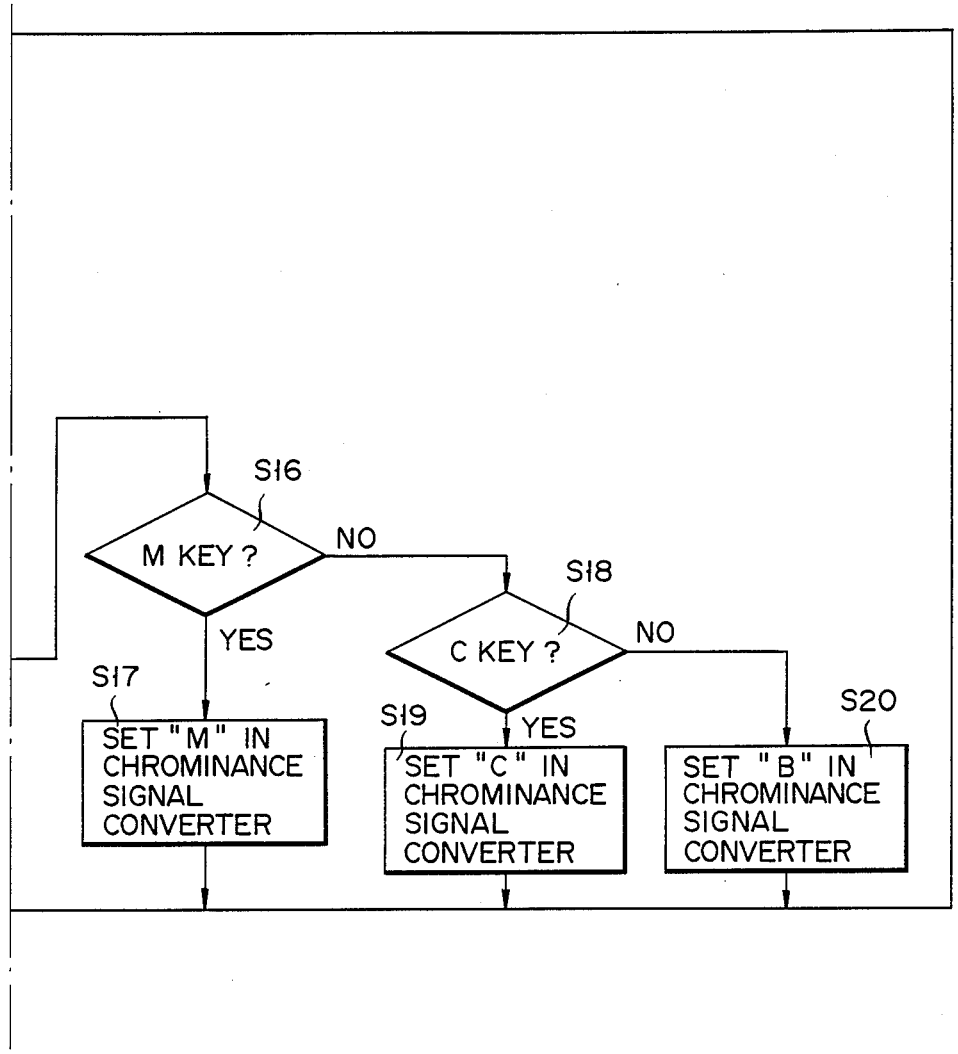
Figure 13B:
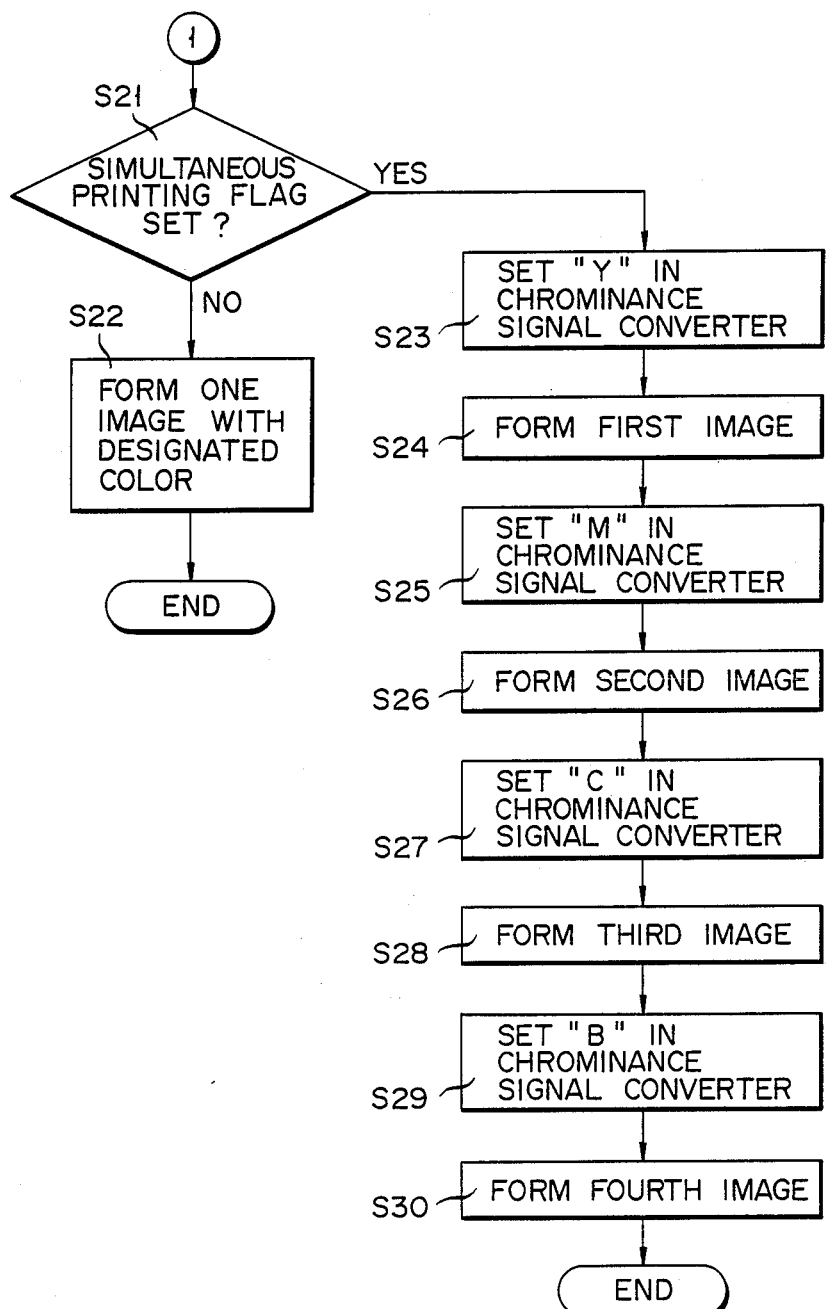

As shown in FIG. 12A, the patterns of positioning marks A at four corners are output. Except for an addition of these patterns, image data from binary circuit 88 is supplied to thermal head temperature controller 93 without any modifications. As a result, positioning marks A as shown in FIG. 12B are printed at four corners and at the same time a main image is also printed in the blank portion.

The operation of the image forming apparatus according to the above embodiment will be described with reference to flow charts of FIGS. 13A-1, 13A-2 and 13B. In step S1, main controller 81 determines whether a single-color mode is set. If NO in step S1, the mode is determined as a normal color copying mode. In this case, the flow advances to step S2. Controller 81 supplies a "0" signal as a reset signal to AND gate 105 in positioning-mark generator 97 and, the flow advances to step S3. In step S3, controller 81 determines in step S3 whether copying key 65 is depressed. If NO in step S3, the flow returns to step S1. However, if YES in step S3, the flow advances to step S4. In step S4, image formation is performed. In this case, since the color copying mode is set, color copying (image formation) is performed using thermal transfer ink ribbon 34 of different colors.

If YES in step S1, i.e., if the single-color mode is determined to be set, the graphic arts film mode is set. In this case, the flow advances to step S5. In step S5, main controller 81 supplies the "1" signal as a mark formation signal to AND gate 105 in positioning-mark generator 97, and the flow advances to step S6. In step S6, the continuous printing flag is reset, and the flow advances to step S7. In step S7, controller 81 sends a conversion instruction for the yellow (Y) color signal to chrominance signal converter 87. The flow then advances to step S8. Controller 81 determines in step S8 whether continuous printing key 72 is depressed. If NO in step S8, the flow advances to step S10. However, if YES in step S8, the flow advances to step S9. In step S9, the continuous printing flag is set. The flow then advances to step S10. Controller 81 determines in step S10 whether one of color selection keys 62 is depressed. If NO in step S10, the flow advances to step S11. Controller 81 determines in step S11 whether the single-color mode is cleared upon depression of mode key 61. If YES in step S11, the flow returns to step S1. However, if NO in step S11, the flow advances to step S12. Controller 81 determines in step S12 whether copying key 65 is depressed. If NO in step S12, the flow returns to step S8. However, if YES in step S12, the flow advances to step S21.

If YES in step S10, i.e., one of color selection keys 62 is determined to be depressed, the flow advances to step S13. In step S13, the continuous printing flag is reset. The flow then advances to step S14. Controller 81 determines in step S14 whether Y key 68 is depressed. If YES in step S14, the flow advances to step S15. In step S15, controller 81 sends a conversion instruction for the yellow (Y) color signal to chrominance signal converter 87. The flow then returns to step S8.

If NO in step S14, the flow advances to step S16. Controller 81 determines in step S16 whether M key 69 is depressed. If YES in step S16, the flow advances to step S17. In step S17, controller 81 sends a conversion instruction for the magenta (M) color signal to chrominance signal converter 87. The flow then returns to step S8.

However, if NO in step S16, the flow advances to step S18. Controller 81 determines in step S18 whether C key 70 is depressed. If YES in step S18, the flow advances to step S19. In step S19, controller 81 sends a conversion instruction for the cyan (C) color signal to chrominance signal converter 87. The flow returns to step S8.

If NO in step S18, the flow advances to step S20. Controller 81 sends a conversion instruction for the black (B) color signal to chrominance signal converter 87 in step S20 and the flow returns to step S8.

Controller 81 determines in step S21 whether the continuous printing flag is set. If NO in step S21, the flow advances to step S22.

In step S22, an image with a designated color component is formed on one sheet. In this case, i.e., in the graphic arts film mode, single-color copying (i.e., image formation) using the black thermal transfer ink ribbon is performed, as previously mentioned. If the signal conversion instruction representing yellow (Y) is supplied to chrominance signal converter 87, an image corresponding to the yellow (Y) component of the original image is formed. If the signal conversion instruction representing magenta (M) is supplied to chrominance signal converter 87, an image corresponding to the magenta (M) component of the original image is formed. If the signal conversion instruction representing cyan (C) is supplied to chrominance signal converter 87, an image corresponding to the cyan (C) component of the original image is formed. If the signal conversion instruction representing black (B) is supplied to chrominance signal converter 87, an image corresponding to the black (B) component of the original image is formed. It should be noted that the black thermal transfer ink ribbon has been set and plastic films as sheets P have been set in advance. Therefore, graphic arts films corresponding to the yellow, magenta, cyan, and black components of the original image can be obtained.

If the continuous printing flag is set in step S21, the flow advances to step S23. In step S23, controller 81 sends a conversion instruction for the yellow (Y) color signal to chrominance signal converter 87. The flow then advances to step S24. The image corresponding to the image of the yellow component is formed on the first plastic film or paper sheet, and the flow advances to step S25.

In step S25, controller 81 sends a conversion instruction for the magenta (M) color signal to chrominance signal converter 87. The flow advances to step S26. In step S26, the image corresponding to the magenta component of the original image is formed on the second plastic film or paper sheet. The flow then advances to step S27.

In step S27, the conversion instruction for the cyan (C) color signal is sent to chrominance signal converter 87. The flow advances to step S28. In step S28, the image corresponding to the cyan component of the original image is formed on the third plastic film or paper sheet. The flow then advances to step S29.

In step S29, the conversion instruction for the black (B) color signal is sent to chrominance signal converter 87. The flow advances to step S30. In step S30, the image corresponding to the black component of the original image is formed on the fourth plastic film or paper sheet.

The method of adding positioning marks A to sheets or films in the single-color image formation mode will be described below.

In the single-color mode, the mark formation signal, i.e., the "1" signal, is supplied from main controller 81 to AND gate 105. AND gate 105 is then enabled. In this state, the image signal of one component of the original is supplied from binary circuit 88 to buffer 107 and is stored therein. In this case, the data sync signal (DCLK) and the line sync signal (HSYNC) are supplied from main controller 81 to counter 100. The line sync signal (HSYNC) and the page sync signal (PSYNC) are supplied to counter 101.

When the image signal representing the first column of the first line is supplied to buffer 107, counters 100 and 101 perform count-up operations. The "1" signal as the pattern selection signal is output from output terminal 103a of ROM 103. The "1" signal as the vertical mark signal is output from output terminal 103b. A "1" signal as a horizontal mark signal is output from output terminal 102a of ROM 102 in response to a count from counter 100 and the signal from output terminal 103a. A "0" signal as register mark data is output from output terminal 102b. The register mark data is stored in buffer 108.

A "1" signal is output from AND gate 104 in response to the vertical mark signal from output terminal 103b and the horizontal mark signal from output terminal 102a. The output from AND gate 104 is supplied to buffer 108 through AND gate 105 and to buffer 107 through AND gate 105 and inverter 106.

The register mark data of logic "0" stored in buffer 108 is supplied as an output from positioning-mark generator 97 to thermal head temperature controller 93. In this case, data output of buffer 107 is inhibited.

Thereafter, register mark data are output for the four corners of the image in the same manner as described above.

When image formation for one color component of the original image is performed in the single-color mode, the patterns of positioning marks A are respectively output at the four corners, as shown in FIG. 12A. Excluding these patterns, image data for one color component is supplied from binary circuit 88 to thermal head temperature controller 93. As a result, cross positioning marks A are formed at four corners of the sheet. Besides these marks, an image of one color component is printed on the sheet.

As is apparent from the above description, the original is optically scanned to obtain cyan, green, and yellow color signals, and these color signals are converted into yellow, magenta, cyan, and black image formation signals. Image formation is performed on plastic films or paper sheets using a black thermal transfer ink ribbon in accordance with one of the color formation signals or four sequentially output image formation signals. Without performing conventional complicated techniques such as exposure and development, graphic arts films can be simply produced with a relatively simple, compact, and inexpensive arrangement. In addition, image formation may be performed on paper sheets by using a thermal transfer ink ribbon of different colors in accordance with image formation signals of four colors. Therefore, the image forming apparatus according to this embodiment can be conveniently used as a color copying machine in addition to a special machine for producing graphic arts films.

Positioning marks can be easily and accurately formed on graphic arts films (block copies).

In the above embodiment, the positioning marks are formed at four corners of the sheet or film. However, one or more marks may be formed. When two or more marks are used, accurate positioning can be performed.

In the above embodiment, a mode key is arranged in the operation panel, and mode selection can be performed using this key. However, a ten-key pad arranged in the operation panel may be used to input a mode selection code, thereby selecting a desired mode.

A separate printing positioning mark-designation switch may be arranged in place of the mode key to designate formation of register marks.

In the image forming apparatus according to the first embodiment of the present invention, the original is optically scanned to obtain color signals of different colors and these color signals are converted into image formation signals of different colors. A single- or multi-color image can be formed on the transfer medium by using a single- or multi-color forming medium in accordance with one or a plurality of image formation signals, thereby easily obtaining graphic arts films and at the same time providing a multi-color image. Image formation is performed on the transfer medium in accordance with one of the image formation signals of different colors and the positioning mark patterns. The positioning marks can be easily and accurately formed during production of graphic arts films.

According to the first embodiment of the present invention as has been described in detail, without using conventional complicated techniques, the graphic arts films can be easily produced with a compact and inexpensive arrangement. The image formation apparatus according to this embodiment also serves as a color copying machine and at the same time easily and accurately forms the positioning marks on graphic arts films.

According to the techniques of the first embodiment described above, graphic arts films (block copies) can be formed using a transfer type color copying machine. However, in the above arrangement, one paper sheet is used for normal multi-color copying, and four plastic films are used for graphic arts. The conditions for feed control and temperature control are changed and image transfer is performed in accordance with the types of image transfer media. For this reason, a special mode selection switch must be arranged prior to image transfer. This indicates that a transfer error may occur upon a depression (operation) error of the mode selection switch.

In the techniques wherein the transfer type color copying machine is simply used to form a block copy, the special selection switch for setting the corresponding mode must be provided. In addition, a transfer error may occur according to an operation error of the mode selection switch.

Strong demand has arisen, therefore, for providing an image forming apparatus wherein a special selection switch need not be arranged to achieve normal multi-color copying and production of graphic arts films and at the same time transfer errors or the like can be prevented.

The main part of a second embodiment satisfying the above requirements will be described below.

In an image forming apparatus according to the second embodiment of the present invention, an original is optically scanned to obtain color signals of different colors, and the color signals are converted into image formation signals of different colors. An image is formed on a transfer medium using a single-color image forming medium in accordance with each of the image formation signals. In this case, the image forming apparatus discriminates whether the image forming medium is normal paper or a graphic arts sheet. The image forming means is controlled in accordance with the discrimination result to form an image. Without arranging a special selection switch, normal multi-color copying can be discriminated from formation of graphic arts films without causing operation and transfer errors.

In the second embodiment, paper cassette 42 for storing normal sheets P has an outer shape different from paper cassette 42' (FIG. 6) for storing plastic films (graphic arts films) P', as shown in FIGS. 14A and 14B. A notch is formed at distal end portion 42a of cassette 42 for storing graphic arts films P'. Detector 100 (a block indicated by the alternate long and two short dashed line in each of FIGS. 6 and 9) consisting of light-emitting and light-receiving elements located at a position corresponding to distal end portion 42a of paper cassette 42 (42') optically discriminates cassette 42 for sheets P from cassette 42' for films P'.

Operation panel 2 in the second embodiment has an arrangement obtained by omitting mode key 61, color selection keys 62, and continuous printing key 72 from operation panel 2 of the first embodiment. Other key arrangements of panel 2 of the second embodiment are the same as those of the first embodiment.

Referring to FIG. 9, main controller 81 is connected to detector 100 and discriminates the normal multi-color copying mode from the graphic arts mode in accordance with a detection result from detector 100. If controller 81 determines the normal multi-color mode, image transfer cycles of all colors are performed for one normal sheet P in units of colors. However, if controller 81 determines the graphic arts mode, image transfer cycles are respectively performed for different films P'. In this case, temperature control or the like must be changed depending on modes.

The color signals are automatically and sequentially selected in either mode (e.g., an order of Y, M, C, and B).

Figure 15:
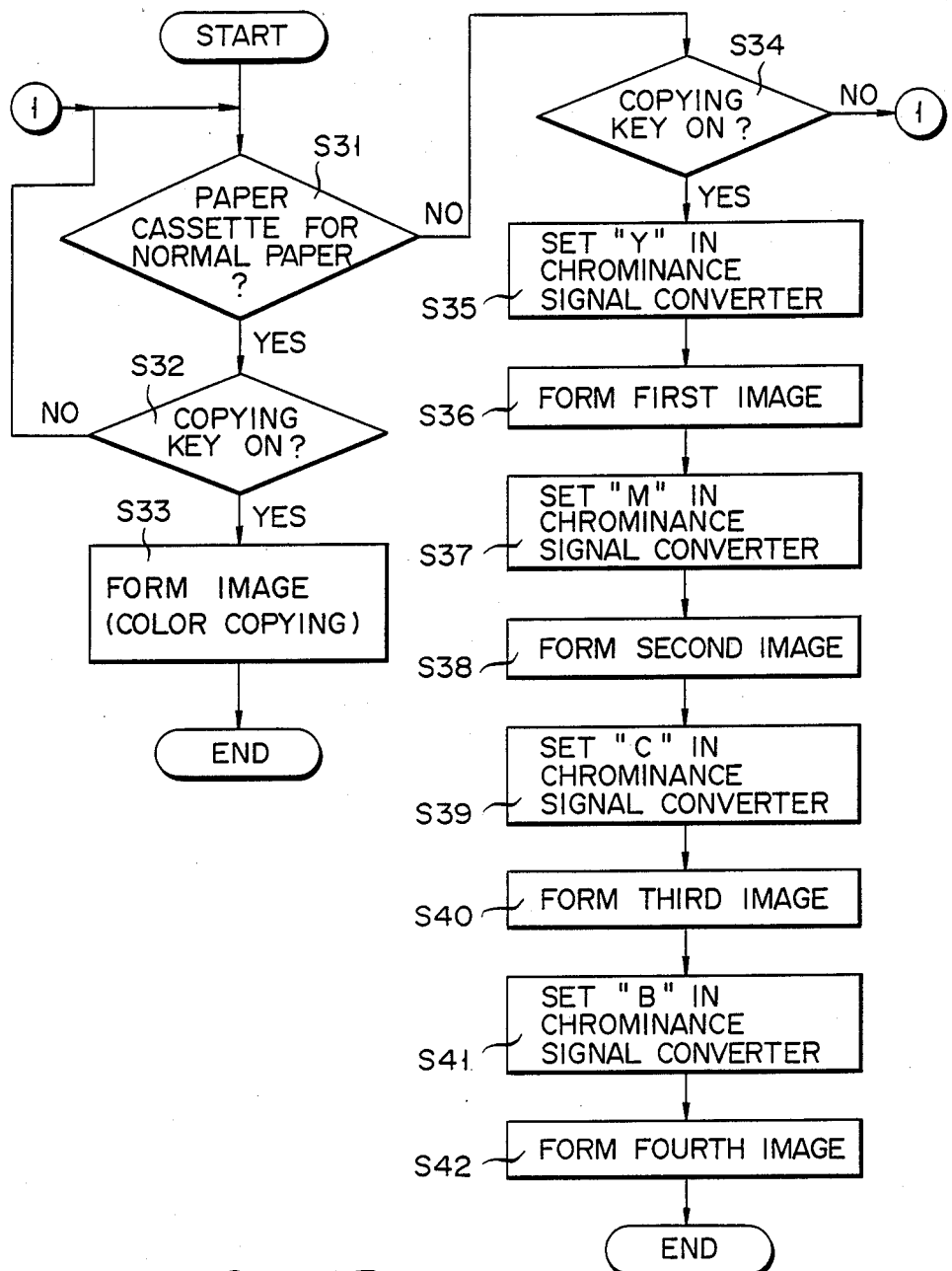

The operation of the second embodiment will be described with reference to a flow chart in FIG. 15. Main controller 81 determines in step S31 whether cassette 42 for normal sheets P or cassette 42' for graphic arts films P' is set. If controller 81 determines that cassette 42 is set, the normal multi-color copying mode is set. In this case, the flow advances to step S32. Controller 81 determines in step S32 whether copying key 65 is turned on. If NO in step S32, the flow returns to step S31. However, if YES in step S32, the flow advances to step S33. Image formation is performed in step S33. In this case, since the multi-color copying mode is set, color copying (image formation) using all color inks of thermal transfer ink ribbon 34 is performed, as described above.

If controller 81 determines in step S31 that cassette 42' for films P' is selected, the graphic arts mode is set and the flow advances to step S34. Controller 81 determines in step S34 whether copying key 65 is depressed. If NO in step S34, the flow returns to step S31. However, if YES in step S34, the flow advances to step S35. In step S35, controller 81 supplies a signal conversion instruction for yellow (Y) to chrominance signal converter 87 and the flow advances to step S36. In step S36, an image corresponding to the yellow component of the original image is formed on first plastic film P' by using yellow ink portion 47Y of thermal transfer ink ribbon 34. The flow then advances to step S37.

In step S37, controller 81 supplies a signal conversion instruction for magenta (M) to chrominance signal converter 87, and the flow advances to step S38. In step S38, an image corresponding to the magenta component of the original image is formed on second plastic film P' by using magenta ink portion 47M of ink ribbon 34. The flow advances to step S39.

In step S39, controller 81 supplies a signal conversion instruction for cyan (C) to chrominance signal converter 87, and the flow advances to step 40. In step 40, an image corresponding to the cyan component of the original image is formed on third plastic film P' by using cyan ink portion 47c of ink ribbon 34, and the flow advances to step S41.

In step S41, controller 81 supplies a signal conversion instruction for black (B) to chrominance signal converter 87. The flow advances to step S42. In step S42, an image corresponding to the black component of the original image is forced on fourth plastic sheet P' by using black ink portion 47B of ink ribbon 34.

As is apparent from the above description according to the second embodiment, the original is optically scanned to obtain cyan, green, and yellow color signals, and these signals are converted into yellow, magenta, cyan, and black image formation signals. Image formation is performed on the plastic films by a thermal transfer ink ribbon of different colors in units of image formation signals. Therefore, color-separated block copies can be produced. Without using the conventional complicated techniques such as exposure and development, graphic arts films can be easily produced with a relatively simple, compact and inexpensive arrangement. The image forming apparatus according to this embodiment can be normally used as a color copying machine, or graphic arts films can be produced quickly and easily.

The block copies corresponding to yellow, magenta, cyan, and black are printed in actually corresponding colors. As compared with the case wherein all block copies are printed in black, the operator can visually identify colors of the block copies. By superposing these block copies, the operator can determine the reproducibility of the original color and can estimate colors that will result in the printing process.

Controller 81 automatically detects whether the paper cassette for normal sheets or paper cassette for graphic arts films is set and determines the proper mode according to the discrimination result. Therefore, without using a special switch, the multi-color mode can be discriminated from the graphic arts mode. For this reason, operation errors, printing errors, and the like can be prevented.

In the above embodiment, block copies of the respective colors are printed at a predetermined density regardless of kinds of color. However, the densities of the images of the block copies may vary. In this case, exposure time for producing blocks from the block copies need not be adjusted.

The number of colors used to form graphic arts films may be one (black), as in the first embodiment.

In the above embodiment, the paper cassettes have different shapes. However, the paper cassettes may have different colors which are then detected to discriminate a proper mode. As shown in FIGS. 16A and 16B, pawl 111 representing the graphic arts film may be disposed near pawls 110 representing a size or the like of normal paper and extending on the side surface of the paper cassette. The mode can be discriminated in accordance with the presence/absence of pawl 111.

Graphic arts film information may be added to the film instead of changing the shape of paper cassettes. For example, as shown in FIGS. 17A and 17B and FIGS. 18A and 18B, no mark is formed on normal sheets P, and bar codes 112 may be formed on graphic arts films P', thereby discriminating the proper mode.

According to the second embodiment of the present invention as has been described in detail, there is provided an image forming apparatus wherein a special selection switch need not be formed and operation and transfer errors can be prevented.

What is claimed is:

1. An image forming apparatus comprising:
   scanning means for optically scanning an original to obtain color signals of different colors;
   color converting means for converting the color signals from said scanning means into image formation signals of different colors;
   determining means for determining whether the image forming medium is a normal paper sheet or a graphic arts film;
   image forming means for forming a single- or multi-color image on an image forming medium by using a single- or multi-color image transfer medium in accordance with one or a plurality of image formation signals outputted from said color converting means;
   means for forming the image by controlling said image forming means in accordance with a determination result of said determining means;
   generating means for generating a positioning-mark pattern; and
   means for adding the positioning-mark pattern from said generating means to the single- or multi-color image when the image is formed by said image forming means.

2. An apparatus according to claim 1, wherein said determining means determines whether the image forming medium is the normal paper sheet of the graphic arts film in response to a detection signal from a detecting means arranged to a position corresponding to a cassette for storing normal paper sheets or graphic arts film.

3. An apparatus according to claim 1, wherein said determining means determines whether the image forming medium is the normal paper sheet or the graphic arts film according to a bar code formed on the graphic arts film.

4. An apparatus according to claim 1, wherein said image forming means forms a single-color image by using a single-color image transfer medium in accordance with one of the image formation signals outputted from said color converting means.

5. An image forming apparatus comprising: scanning means for optically scanning an original to obtain color signals of different colors;
   color converting means for converting the color signals from said scanning means into image formation signals of different colors;
   determining means for determining whether the image forming medium is a normal paper sheet or a graphic arts film;
   image forming means for forming a single- or multi-color image on an image forming medium by using a single- or multi-color image transfer medium in accordance with one or a plurality of image formation signals outputted from said color converting means;
   means for forming the image on the graphic arts film by controlling said image forming means when a determination result of said determining means is the graphic arts film;
   generating means for generating a positioning-mark pattern; and
   means for adding the positioning-mark pattern from said generating means to the single- or multi-color image when the image is formed on the graphic arts film by said image forming means.

6. An apparatus according to claim 5, wherein said determining means determines whether the image forming medium is the normal paper sheet or the graphic arts film in response to a detection signal from detecting means arranged at a position corresponding to a cassette for storing normal paper sheets or graphic arts film.

7. An apparatus according to claim 5, wherein said determining means determines whether the image forming medium is the normal paper sheet or the graphic arts film according to a bar code formed on the graphic arts film.

8. An apparatus according to claim 5, wherein said image forming means forms a single-color image by using a single-color image transfer medium in accordance with one of the image formation signals outputted from said color converting means.

9. An image forming apparatus comprising: scanning means for optically scanning an original to obtain color signals of different colors;
   color converting means for converting the color signals from said scanning means into image formation signals of different colors;
   determining means for determining whether the image forming medium is a normal paper sheet or not;
   image forming means for forming a single- or multi-color image on an image forming medium by using a single- or multi-color image transfer medium in accordance with one or a plurality of image formation signals outputted from said color converting means; and
   means for forming the image by controlling said image forming means in accordance with a determination result of said determining means.

* * * * *